P. F. SPERY.
FILM SHIFTING MECHANISM.
APPLICATION FILED APR. 27, 1914.

1,187,935.

Patented June 20, 1916.
3 SHEETS—SHEET 1.

Witnesses:

Inventor
Philmon F. Spery
By Luther Johns Atty.

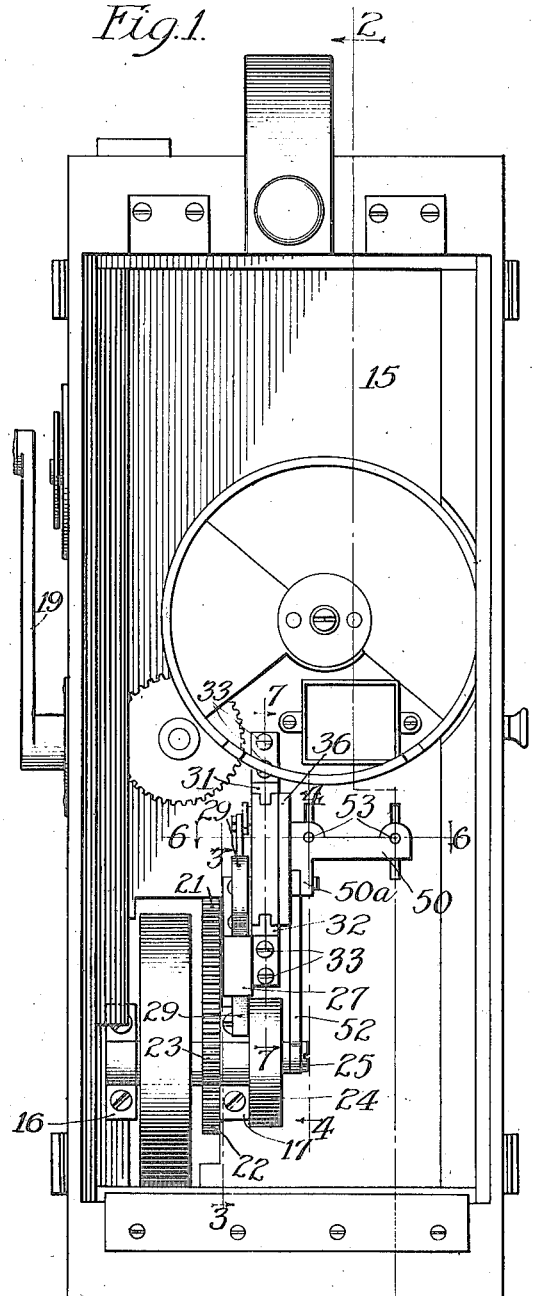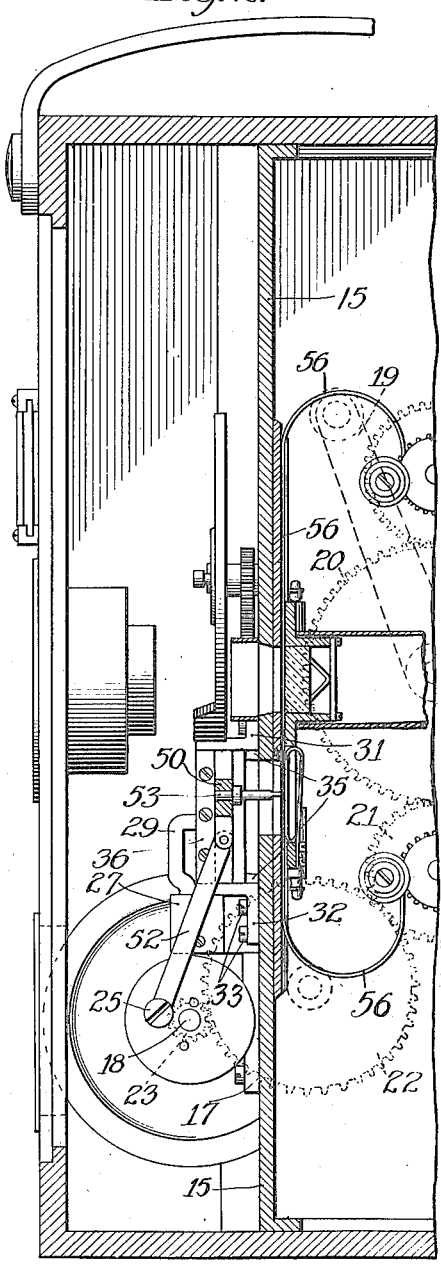

P. F. SPERY.
FILM SHIFTING MECHANISM.
APPLICATION FILED APR. 27, 1914.
1,187,935.
Patented June 20, 1916.
3 SHEETS—SHEET 2.
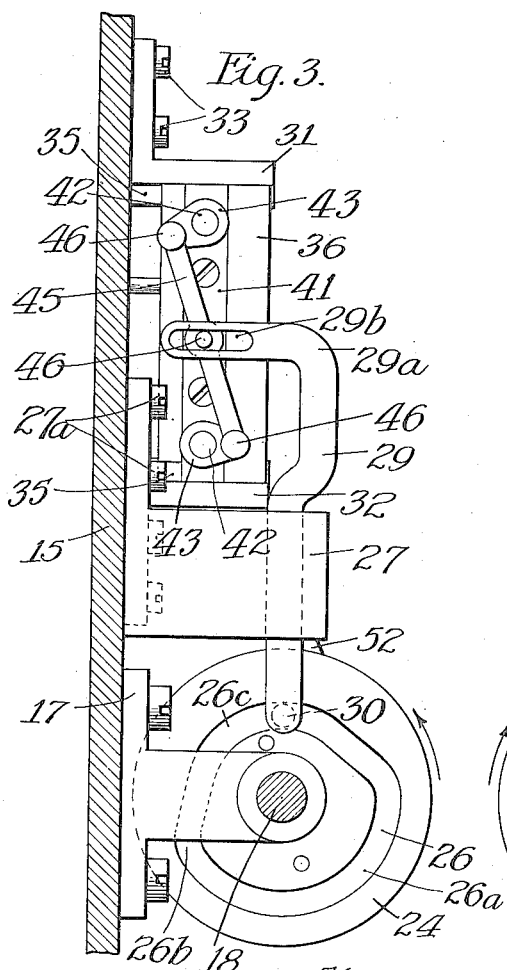
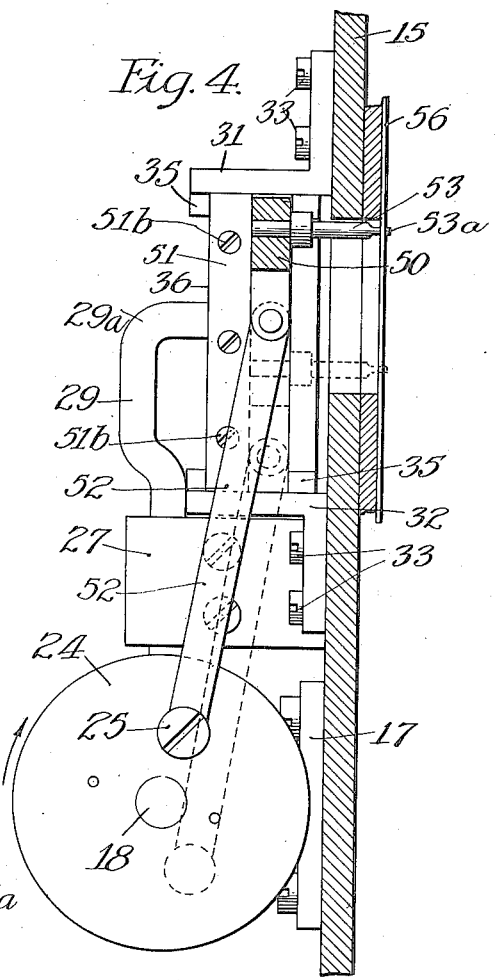
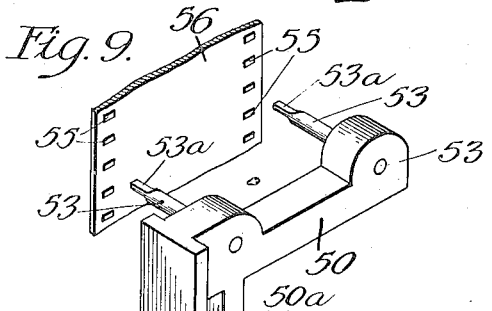
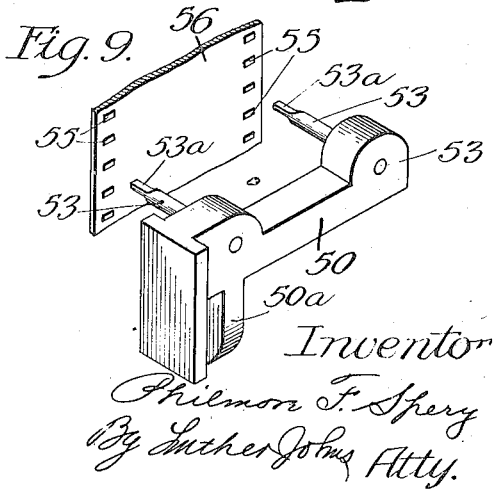

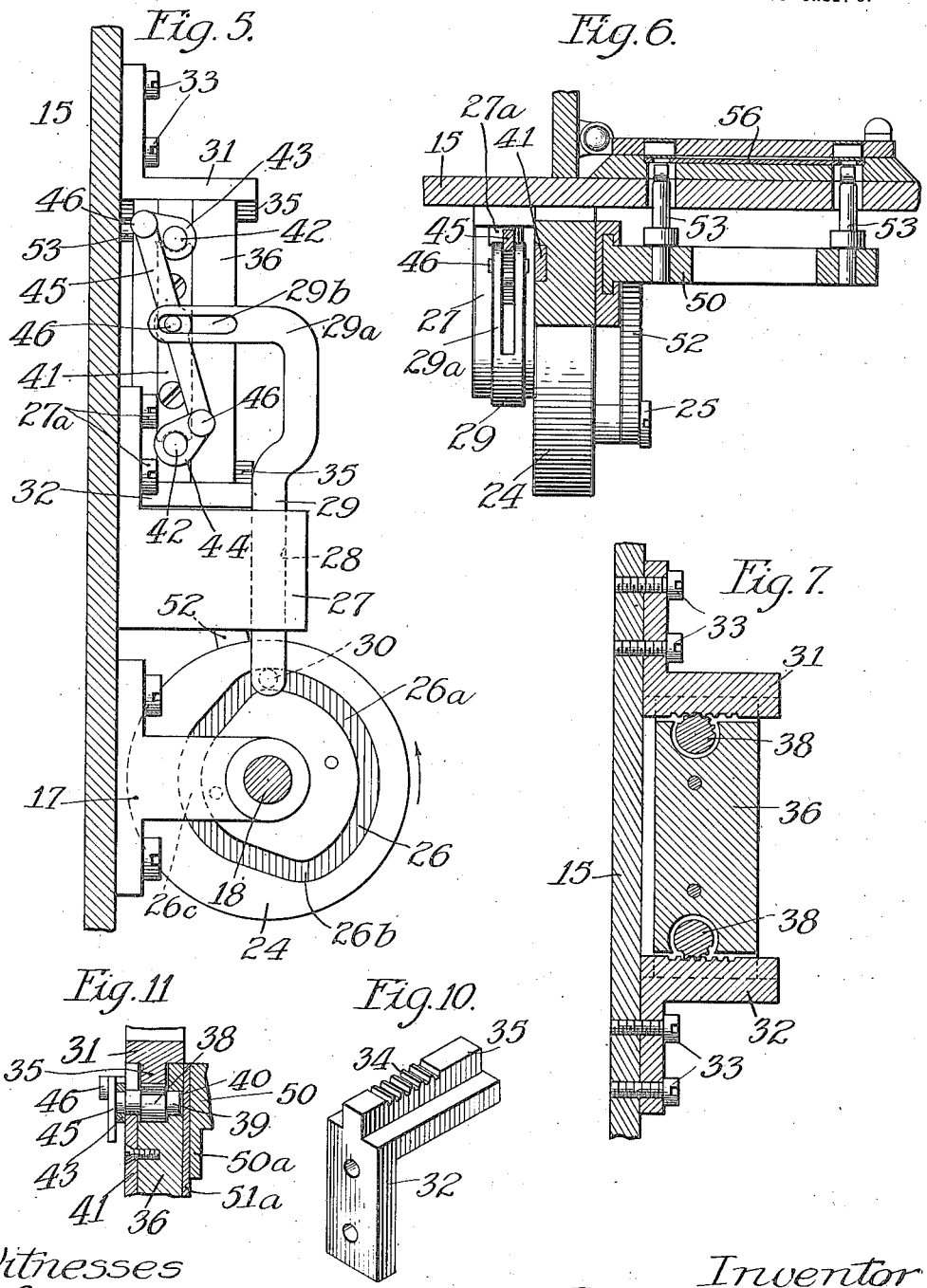

UNITED STATES PATENT OFFICE.

PHILMORE F. SPERY, OF CHICAGO, ILLINOIS, ASSIGNOR TO AMERICAN CINEMATOGRAPH COMPANY, OF CHICAGO, ILLINOIS, A CORPORATION OF ILLINOIS.

FILM-SHIFTING MECHANISM.

1,187,935. Specification of Letters Patent. Patented June 20, 1916.

Application filed April 27, 1914. Serial No. 834,603.

*To all whom it may concern:*

Be it known that I, PHILMORE F. SPERY, a citizen of the United States, residing in Chicago, county of Cook, and State of Illinois, have invented certain new and useful Improvements in Film-Shifting Mechanism, of which the following is a specification.

My invention relates to moving picture apparatus, and more particularly to film-shifting devices therewith.

The objects of the invention are principally to provide a film-shifting device capable of rapid operation unaccompanied by objectionable vibration and noise, and which will permit of operating the film in either direction as desired; to provide a film shifting device durable in construction, positive and certain in operation, and which is not likely to get out of order and fail to act at critical times. Other objects will appear hereinafter.

Figure 1:
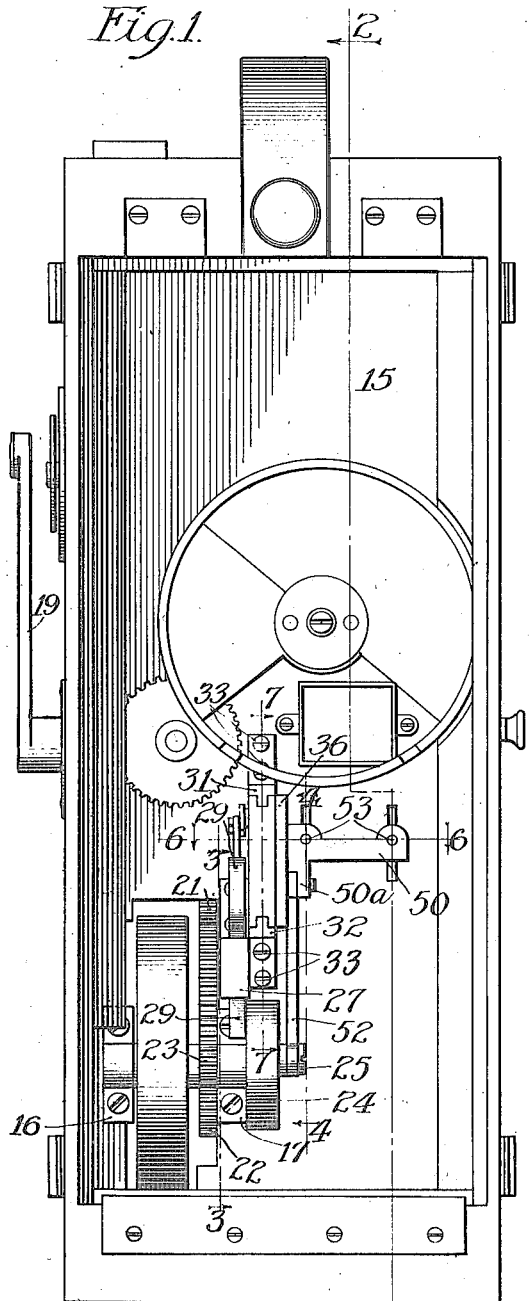
Figure 2:
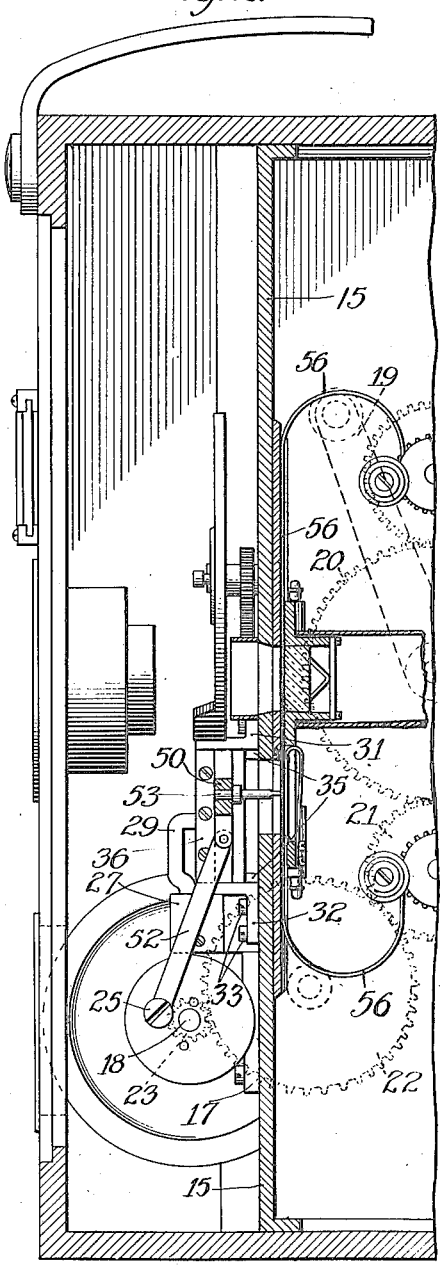

In the accompanying drawings, which form a part of this specification, I have illustrated a preferred embodiment of these improvements and in Figures 1 and 2 thereof have shown their application to apparatus for taking pictures upon a film. The invention is not limited, however, to such use, as it is equally applicable to film-printing apparatus and to projection apparatus, although possibly more suitable for use on the picture taking and printing machines than to the projection machines in the form of the device illustrated herewith. In its broadest aspect the invention is in a mechanical movement capable of application to various other arts than that of moving picture apparatus.

In these drawings Fig. 1 is a face view of a moving picture camera with my present improvements in operative position thereon, the front of the camera being removed; Fig. 2 is a sectional view of the front end of the camera, as on the line 2—2 of Fig. 1; Fig. 3 is an enlarged vertical section of the film-shifting mechanism on the line 3—3 of Fig. 1; Fig. 4 is a similar sectional view on the line 4—4 of Fig. 1; Fig. 5 is a view similar to that of Fig. 3, but showing the parts in another operative position; Fig. 6 is an enlarged horizontal section on the line 6—6 of Fig. 1; Fig. 7 is a similarly enlarged vertical section on the line 7—7 of Fig. 1; Fig. 8 is an enlarged perspective of a block-like guiding and supporting element shown in most of the figures; Fig. 9 is a similar perspective of a reciprocatory mounting and film-engaging elements thereon; Fig. 10 is a similar perspective of one of the two racks and guides shown, for instance, in Fig. 7; and Fig. 11 is an enlarged section showing one of the pinion-like elements and its mounting.

On a suitable support, for instance the wall 15, of the camera shown, a pair of standards 16 and 17 are secured providing bearings for the driving shaft 18. By reference to Fig. 2 is will be seen that this driving shaft is rotated by means of the crank 19 and the train of gears 20, 21, 22 and 23, the last mentioned being upon the shaft 18. This driving shaft has also rigidly secured thereon the wheel-like element 24, on which, spaced from the axis, is a crank pin 25. The side of this wheel-like element opposite the crank pin is provided with a cam track 26. A block-like support 27 is rigidly secured to the camera wall 15, as by the screws 27ª, which support is provided with a guide-way 28, in which guideway is positioned for reciprocatory movement the connecting element 29. It will be observed that the guide-way 28 is of considerable relative length, which is advantageous in preventing the canting of the element 29 therein. A pin or friction roller 30 is mounted upon the connecting element 29 for travel in the cam track 26, from which arrangement it will be apparent that as the cam element rotates, the connecting piece 29 will be reciprocated in the support and guide 27.

Two rack elements 31 and 32 are secured, as by screws 33, to the wall 15, which elements respectively have a rack 34 cut in the face of a tongue-like projection 35 constituting a guide. These guides and racks preferably face each other as illustrated, and between them is positioned a block-like support 36 having a guide-way 37 at each end thereof adapted to interfit with the guides 35. In each end of this element 36 is positioned a toothed element 38, suitably in the general form of a pinion, but not necessarily provided with teeth all around, as these toothed elements are required to rock through but a comparatively small arc. As well illustrated in Fig. 7, the toothed portion of the segmental elements 38 are in operative association with the racks 34 respectively. These pinion-like or segmental gears 38 are suitably provided with axial extensions on each side thereof, one extension or stud axle 39 projecting into a suitable recess 40 as a bearing in the element 36 (Fig. 11), the two gears 38 being suitably held in operative position in the element 36 by the overlapping ends of the plate 41, as shown by dotted lines in Fig. 5. On the stud shafts 42 of the pinion-like elements 38 are secured the crank arms 43 and 44 respectively, these crank arms being oppositely directed, as illustrated, and connected together by a link 45 pivotally mounted upon pins 46 on the crank arms respectively. The reciprocating connecting piece 29 has its end 29$^a$ provided with a slotted opening 29$^b$ occupied by the pin 46 substantially midway on the link 45 between the two pivots 46. It will now be understood that when the connecting piece 29 is reciprocated by the cam element the crank arms 43 and 44 will be rocked causing the pinion-like elements 38 to creep in one direction and the other upon the racks 34, in each instance carrying with them the block-like carrier element 36. Owing to the arrangement of the crank arms 43 and 44 such creeping movement will be the same at each end of the element 36, the provision of a pinion-and-rack device at each end preventing this carrier 36 from canting on its guides 35. For each revolution of the cam element 24 the element 29 will be moved once forward and once backward, thus moving the block 36 once in each of its reciprocatory directions.

Turning now to the opposite side of the device from that just considered, namely to the side shown in Fig. 4, it will be seen that the sliding support or mounting 50 is arranged to travel in a guide-way 51 (see Fig. 8) in the block element 36. This guide-way 51 may be formed in a separate piece of metal 51$^a$ secured as by screws 51$^b$ to the other portion of the block-like structure to which, in its entirety, as shown by Fig. 8, I have applied the reference numeral 36. The element 50 (Fig. 9) may suitably have a projection 50$^a$ upon which is pivoted the pitman 52, this pitman being also pivoted on the crank pin 25. On the reciprocatory support 50 are secured preferably two film engaging elements 53, which may suitably be in the form of pins having their free ends 53$^a$ formed with substantially flat upper and lower film engaging faces, the free ends of the elements 53 being so spaced apart and so formed that they respectively enter the lateral punctures or openings 55 in the film 56. The element 50 plainly makes one complete reciprocation with each revolution of the driving element 24, a portion of which plainly constitutes a crank on the shaft 18.

The arrangement of the cam track 26 is such that when the film is being shifted in its normally direct or forward movement the movable element 36 is moved toward the film 56 at what is normally the beginning of the film shifting stroke, the parts at the end of the first film-engaging movement being in the position shown in full lines in Fig. 4, the flat-faced ends 53$^a$ of the film engaging elements 53 being projected into oppositely disposed apertures 55 in the film 56. The pins 53 are maintained in such engagement with the film by the concentric portion 26$^a$ of the cam track until the mounting 50 has traveled to the other end of its stroke, at which time owing to the change in direction of the cam track, as at 26$^b$, the block 36 is caused to move away from the film, carrying the block 50 with it and consequently retracting the film-engaging elements from the film. While the pin 30 traveling in the cam track is in the concentric position 26$^c$, as shown in Fig. 3, the film-engaging elements are maintained away from the film, and this condition exists until the pitman 52 has driven the film-engaging elements back to their first position ready to begin another cycle of operations.

An important feature of this invention resides in the fact that the movement of the film-engaging elements to and from the film is very slight. I have found that an in-and-out movement of the carriers 50 of three-sixteenths of an inch is considerably more than is actually necessary, the only requirement being that these pin-like elements shall have in-and-out movement sufficient for their suitable engagement with the film to shift the same and to clear the film on the return longitudinal movement. This small amount of in-and-out movement makes for steadiness of operation, freedom from vibration and rapidity of movement of the shifting device. A further advantage is in the fact that the film-engaging pins move to and from the film substantially at right angles to its course of travel at the picture taking portion thereof, and in the fact that opposed surfaces of the ends 53$^a$ of the pins 53 are formed for suitable moving engagement with the film on two sides of the openings 55 of the film, these opposed film-engaging surfaces being preferably substantially parallel with each other where the openings 55 are substantially rectangular. Should these openings 55 be given a different shape, the ends 53$^a$ may be changed accordingly. The device is thus adapted to move the film in either longitudinal direction by merely reversing the direction of movement of the crank 19. It is pointed out that the movement of the film-engaging portion of either of the pins 53, is in the direction of a substantially rectangular parallelogram having two relatively long sides and two relatively short ends, and that whether the crank 19 is turned in direct or reverse direction this parallelogram movement is the same, except, of course, that the order of its description is reversed.

It is understood, of course, that the film must be at rest while the exposure is being made, which means that the film must be moved intermittently, and yet quite rapidly. It is also pointed out that an exceedingly slight variation in the longitudinal movement of the film while the pictures are successively being made results in relatively great variation in the pictures projected upon the screen. Heretofore considerable difficulty has been experienced with film-shifting devices in which the parts have considerable in-and-out movement and are so constructed that various forces of operation cause an unequal movement of the film. By the present means the film is moved a certain predetermined fixed distance in each cycle of operations, the film-engaging elements being moved positively in and out without appreciable variation from one time to another. While the pins 53ª are drawing the film from the beginning to the end of a single movement these pins do not move relative to the film and thus save it from wear and bending, which avoids enlargement of the openings 55 of the film and which would cause bad results in the projection work.

While I have illustrated and described a preferred embodiment of these improvements, it will be apparent to those skilled in the art that various changes and modifications may be made therefrom without departing from the spirit of the invention. Reference should be had, therefore, to the appended claims to determine the scope of the invention herein set forth, and all such changes and modifications are contemplated by me as fall within the scope of these claims.

I claim:

1. In a film-shifting device for motion picture apparatus, the combination of a film-engaging element, means for moving said film engaging element back and forth in spaced apart paths, and means for moving said film engaging element in and out from one path into the other thereof whereby the film is alternately engaged thereby and released therefrom, said second mentioned means including a toothed rack, a gear-like element intermeshing with said rack, and means for rocking said gear-like element.

2. In a film-shifting device for motion picture apparatus, the combination of a film-engaging element adapted to enter an opening in a movably mounted film, and means for moving said film-engaging element in a substantially rectangular path of travel, said means including a pinion-and-rack device adapted to impart motion to said film-engaging device in two opposite directions, namely, toward and from such film, and a crank arm adapted to impart motion thereto in two opposite directions substantially at right angles to said first mentioned directions.

3. In a film-shifting device, the combination of a film-engaging element and means for moving the same in and out for engaging and releasing the film and also back and forth to shift the film, said means including a film-engaging element support and pinion-and-rack means for moving said support in and out, and a mounting for said film-engaging element and means for moving said mounting back and forth on said support.

4. In moving picture apparatus, the combination of means for causing a film having lateral punctures to travel lengthwise, a pin-like film-engaging element adapted to enter one of such punctures, said film-engaging element being mounted for travel back and forth, one direction of such travel being in the longitudinal direction of travel of a portion of such film, means for so moving said film-engaging element back and forth, and means for moving said film-engaging element into one of such apertures at one end of said element's course of travel and for retracting the same therefrom at the other end thereof, said last mentioned means including a toothed element operatively associated with said film-engaging element, a relatively fixed rack engaged by said toothed element, and means for rocking said toothed element alternately in one direction and the other.

5. In moving picture apparatus, the combination of means for mounting a film for longitudinal travel with a portion thereof substantially flat, a film-engaging element mounted to travel back and forth, one direction of said movement being that of the longitudinal travel of such substantially flat portion of such film, the other movement being in the reverse direction, means for so moving said element back and forth, and means for alternately moving said element into and out of engagement with said film, said last mentioned means including a relatively fixed rack, a pinion-like toothed element operatively connected with said film-engaging element and in engagement with said rack, and means for rocking said toothed element alternately in opposite directions, said last mentioned means including a cam.

6. In moving picture apparatus, the combination of means for mounting a film for longitudinal travel, a film-engaging element, a mounting on which said element is secured, said mounting being adapted to have reciprocatory movement, one direction of said reciprocatory movement being that of the travel of a portion of such film, means for so reciprocating said mounting, means operatively associated with said mounting for moving the same alternately toward and from such film whereby said film-engaging element alternately engages and is disengaged from such film, said means including a segmental toothed element, a rack having teeth thereon engaged by said segmental toothed element, and means for rocking said toothed element.

7. In moving picture apparatus having means for mounting a laterally punctured film to travel with a portion thereof substantially flat, the combination of a pin-like element mounted to have a film-engaging portion thereof travel back and forth in spaced apart paths, one of said paths substantially coinciding with the path of movement of such substantially flat portion of such film, means for so moving said pin-like element, means for alternately moving said engaging portion of said pin-like element into and out of the plane of movement of said film whereby such engaging portion enters a puncture of such film and is retracted therefrom, said last mentioned means including a rack on said apparatus relatively fixed with respect to said pin-like element, a curved toothed element mounted to intermesh with and to travel on said rack and to convey its own bodily movement to said pin-like element, and means for rocking said toothed element alternately in opposite directions.

8. In moving picture apparatus, the combination of a driving shaft having a driving crank and a cam element thereon, a pair of racks spaced apart rigidly mounted upon a suitable support therefor, a movable carrier element between said racks, portions of said racks respectively constituting guides for said carrier element, a pair of segmental gears mounted to rock in said carrier element, said gears respectively being in engagement with said racks respectively, a crank on each of said gears, a link operatively connecting said gear cranks, a connecting device operatively in association with said cam element and with said link whereby a back and forth movement is communicated to said link thereby simultaneously rocking said gears, the arrangement of said gear cranks, connecting device and cam element being such that said carrier element is reciprocated in said guides by the rotation of said cam element, a pair of pin-like film-engaging elements mounted on a support, said support being mounted to reciprocate upon said carrier, and a connection between said driving crank and said last mentioned reciprocating support.

9. The combination with apparatus having means for mounting a film to travel with a portion thereof substantially flat, of a film-shifting device comprising in combination a pin-like film-engaging element mounted for back and forth film-shifting movement and for in-and-out movement, a driving shaft, a crank arm and a cam on said shaft, a rack on said apparatus relatively fixed with respect to said pin-like element, a segmental gear operatively associated with said pin-like element and in engagement with said rack, and means operatively connecting said gear and said cam whereby rotation of the cam rocks the gear alternately in opposite directions, and moves said film engaging element in and out and a suitable operative connection between said pin-like element and said crank arm, whereby the revolution of said crank arm moves said pin-like element in the film-shifting direction.

10. In a film-shifting device, the combination of a pair of relatively fixed guides, a rack on each of said guides, a movable element mounted for reciprocation in said guides, a pair of segmental gears operatively mounted in said movable element and in engagement with said racks respectively, crank-like means on each segmental gear, a link connecting said crank-like means together, the arrangement of said crank-like means and link being such that a movement of said link adapted to cause one of said segmental gears to creep upon its rack in one direction will cause the other of said gears to creep upon its rack substantially equally and in the same direction, and means for moving said link alternately in opposite directions whereby a substantially uniform creeping movement is simultaneously applied to each of said gears, which creeping movement is alternately in one direction and the other in said guides, a film-engaging element mounted to reciprocate on said movable element, and means for reciprocating said film-engaging element.

PHILMORE F. SPERY.

Witnesses:
A. ARMOUR,
M. A. KIDDIE.